United States Patent
Liechti (10) Patent No.: US 12,528,104 B2
(45) Date of Patent: Jan. 20, 2026

(54) MEMS SPEAKER AND METHOD OF MICROFABRICATION OF SUCH A SPEAKER

(71) Applicant: COMMISSARIAT À L'ENERGIE ATOMIQUE ET AUX ENERGIES ALTERNATIVES, Paris (FR)

(72) Inventor: Romain Liechti, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1005 days.

(21) Appl. No.: 17/677,477

(22) Filed: Feb. 22, 2022

(65) Prior Publication Data

US 2022/0266299 A1 Aug. 25, 2022

(30) Foreign Application Priority Data

Feb. 23, 2021 (FR) ...................... 2101743

(51) Int. Cl.
  *B06B 1/06* (2006.01)
  *B81B 3/00* (2006.01)
  *B81C 1/00* (2006.01)

(52) U.S. Cl.
  CPC .......... *B06B 1/0603* (2013.01); *B81B 3/0021* (2013.01); *B81B 3/0024* (2013.01); *B81C 1/00373* (2013.01); *B81C 1/00396* (2013.01)

(58) Field of Classification Search
  CPC .. H10N 30/302; H10N 30/875; H10N 30/877; B06B 1/0603; B81B 3/0021; B81B 3/0024; B81C 1/00373; B81C 1/00396
  See application file for complete search history.

(56) References Cited

U.S. PATENT DOCUMENTS

| | | | |
|---|---|---|---|
| 2005/0162040 A1* | 7/2005 | Robert | H03H 9/173 310/322 |
| 2017/0094418 A1 | 3/2017 | Clerici et al. | |
| 2017/0117823 A1* | 4/2017 | Arnaud | F03G 7/06 |
| 2017/0325030 A1 | 11/2017 | Stoppel et al. | |

OTHER PUBLICATIONS

Search Report as issued in French Patent Application No. 2101743, dated Nov. 15, 2021.
Kommepalli, H. K. R., "Design, Modeling, and Optimization of Piezoelectric Actuators," A Dissertation in Medical Engineering, The Pennsylvania State University, May 2010, 138 pages.
Sturtzer, E., et al., "High Fidelity MEMS Electrodynamic Micro-Speaker Characterization," HAL Open Science, Journal of Applied Physics, American Institute of Physics, (2013), 29 pages, hal-01103610.
Stoppel, F., et al., "Novel type of MEMS loudspeaker featuring membrane-less two-way sound generation," Audio Engineering Society, Convention Paper 9874, Presented at the 143rd Convention—Oct. 18-21, 2017, 6 pages.

* cited by examiner

Primary Examiner — Derek J Rosenau
(74) Attorney, Agent, or Firm — Pillsbury Winthrop Shaw Pittman LLP (57) ABSTRACT

A MEMS speaker suitable for generating audible sound waves, includes a bimetallic strip actuation system extending in a first plane and an amplification capsule including a membrane extending in a second plane, parallel to the first plane, the membrane including a rigid interior zone and a flexible exterior zone, and a rigid coupling wall, fastened at the periphery of the bimetallic strip actuation system to make the exterior zone of the membrane integral with said actuation system.

9 Claims, 7 Drawing Sheets

Figure 2:
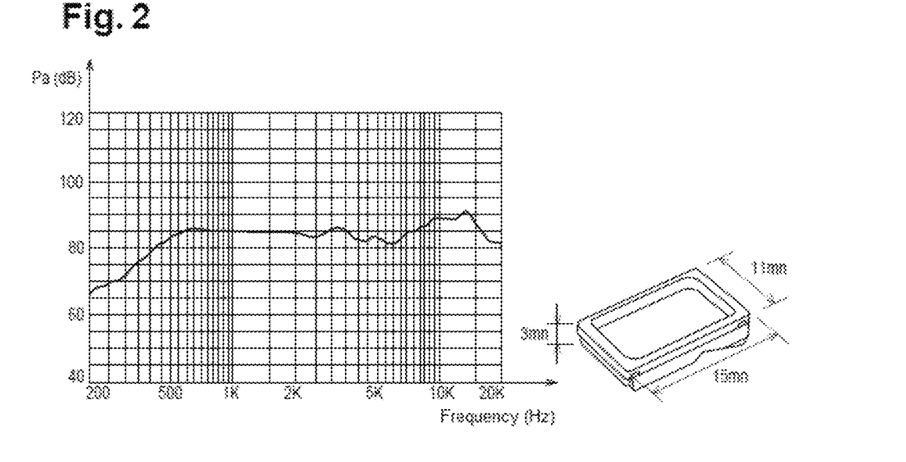
FIG. 2, already described, shows a schematical view of a conventional miniature speaker integrated into current portable devices and a curve of the radiated pressure, according to the frequency, of this speaker.

Fig. 17 though the radiated pressure (Pa) is about 85 dB over a wide frequency range, the size of such a speaker is increasingly less compatible with the dimensions of the portable apparatuses of which the trend is to be increasingly smaller and thinner. Indeed, not only the manufacturers of portable devices seek to carry out devices that are increasingly smaller, but in addition they seek to include more and more functionalities within the same portable device, which implies a decrease in the size of each one of the systems that allows for the implementation of these functionalities.

MEMS SPEAKER AND METHOD OF MICROFABRICATION OF SUCH A SPEAKER

CROSS REFERENCE TO RELATED APPLICATIONS

This application claims priority to French Patent Application No. 2101743, filed Feb. 23, 2021, the entire content of which is incorporated herein by reference in its entirety.

FIELD

The present invention relates to a miniaturised speaker suitable for being integrated into portable devices such as portable computers, portable telephones, wireless headsets, etc. The invention also relates to a method of microfabrication of such a speaker.

The invention has applications in the field of acoustics for the generating of sound waves that can be heard by the human ear. It in particular has applications in the field of acoustics dedicated to portable devices that require miniaturised speakers.

BACKGROUND

Figure 1:
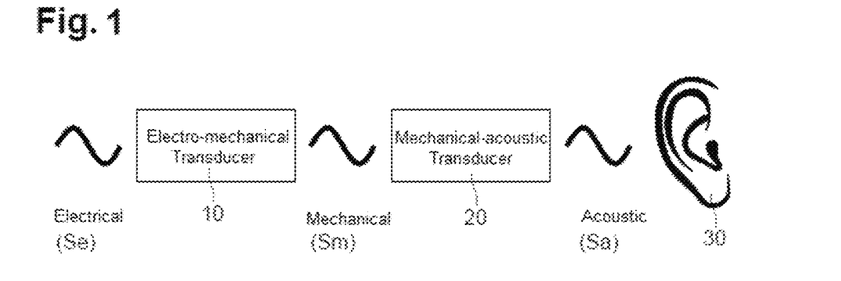
FIG. 1, already described, schematically shows the electro-mechanical-acoustic operation of a speaker.

It is known, in acoustics, to use a speaker to generate sound waves that can be heard by the human ear. A speaker is an apparatus designed to transform an electrical signal into acoustic pressure, as shown functionally in FIG. 1. A speaker is an electro-mechanical-acoustic transducer comprising:
- a first electro-mechanical transducer 10 that converts the voltage of an electrical signal (Se) into a mechanical signal (Sm) such as a displacement, and
- a second mechanical-acoustic transducer 20 that converts this displacement (Sm) into an acoustic pressure (Sa), that can be heard by the human ear 30. This second mechanical-acoustic transducer 20 is generally an acoustic membrane, coupled to the ambient air.

For several years, with the development of portable devices such as portable computers, tablets, portable telephones and even wireless headsets, it is sought to miniaturise the speakers so that they can be integrated into these portable devices. However, in this context of miniaturisation, it is difficult to carry out a speaker that has good performance.

Indeed, a good speaker, i.e. a speaker that has good performance, reproduces all the frequencies of the audio band that can be heard by the human ear (20 Hz to 20 kHz) at the same amplitude, with a low distortion rate. In practice, the lowest frequency at which a speaker effectively produces sound is determined by the resonance frequency of the mechanical-acoustic transducer. However, in a context of miniatursation, the actuation system of the membrane is more rigid and the mass of the membrane is lower, which increases the resonance frequency of the system and therefore reduces its bandwidth.

Figure 3:
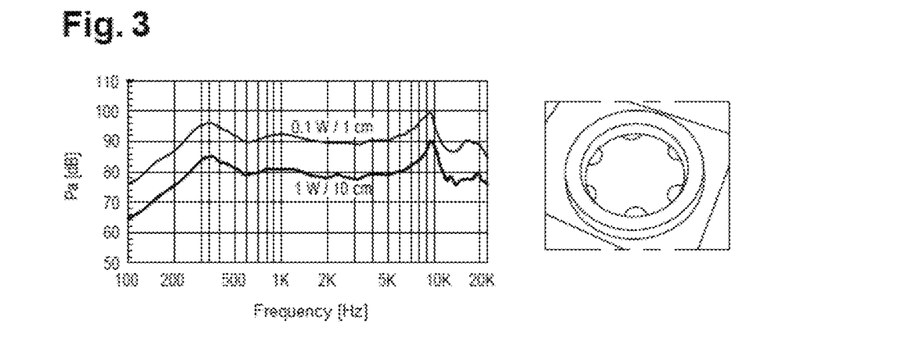
FIG. 3, already described, shows a schematical view of a microfabricated speaker and a curve of the acoustic pressure, according to the frequency, of this speaker.

In addition, the level of acoustic pressure radiated by a speaker depends on the volume of air accelerated by said speaker and this accelerated volume of air depends on the product of the surface of the membrane of the speaker and the maximum displacement of this membrane. In a context of miniaturisation, the surface of the membrane is greatly reduced; a substantial displacement of the membrane is therefore required to obtain a satisfactory level of pressure. An example of the level of acoustic pressure (Pa) radiated by a speaker measuring 11×15×3 mm³ is shown in FIG. 2. Al- Several technologies are currently used for the actuation of the membranes of speakers. One of these technologies is electromagnetic transduction which makes it possible to achieve relatively large displacements of the membrane. The vast majority of current speakers are equipped with electromagnetic transducers. An example, shown in FIG. 3, of an electromagnetically actuated speaker and of its acoustic pressure (Pa) is described in the article "High Fidelity MEMS Electrodynamic Micro-Speaker Characterization" of E Sturtzer, I Shahosseini, G Pillonnet, E Lefeuvre and G Lemarquand, Journal of Applied Physics, American Institute of Physics, 2013, pp. 9, ffhal-01103610. However, although such a speaker with electromagnetic transducers has good performance, its dimensions do not allow for an integration into current portable devices. Furthermore, using a magnet in the actuation system makes manufacturing this type of speaker incompatible with the methods of microfabrication.

Figure 4:
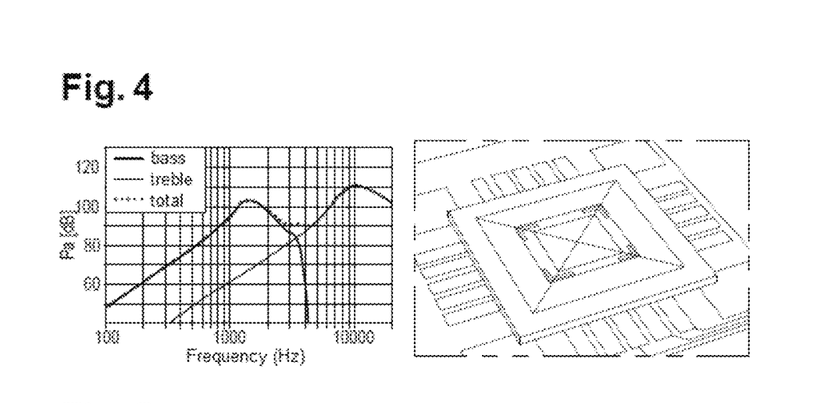
FIG. 4 shows a schematical view of a microfabricated speaker with piezoelectric actuation and a curve of the acoustic pressure, according to the frequency, of this speaker.

Another known technology of actuating the membrane that shows notable performance is piezoelectric transduction. Although this piezoelectric transduction technology does not confer any large displacements of the membrane, it has the advantage of being compatible with the methods of microfabrication. Indeed, by using the bimetallic effect and by positioning the piezoelectric actuator on the membrane, performance that is comparable with that of electromagnetic transducers can be achieved. An example of a microfabricated speaker with piezoelectric actuation and of its acoustic pressure (Pa) is shown in FIG. 4 and described in the article titled "Novel Type of MEMS Loudspeaker Featuring Membrane-Less Two-Way Sound Generation" of F Stoppel, F Niekiel, T Giese, S Gu-Stoppel, A Mannchen, J Nowak, D Beer, and B Wagner, AES, New York, 2017, 6. However, although such a microfabricated speaker offers interesting performance, it requires a membrane of about 10×10 mm², which takes up too much space for current portable devices. In addition, the membrane of this type of speaker is not unalterable (doesn't keep its shape), which is a required property in order to ensure good audio quality over the long term.

Figure 5:
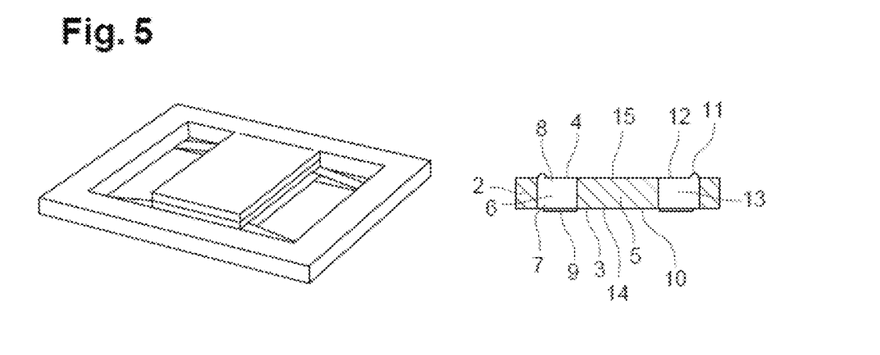
FIG. 5 shows a schematical profile view as a cross-section of a speaker with piezoelectric actuation the membrane of which is offset.

Patent US 2017/0094418 A1 describes an alternative of a speaker with piezoelectric actuators, wherein the piezoelectric actuators are shifted from the membrane, as shown in FIG. 5. In this example, the actuators 9 are not directly on the membrane 15. They are shifted (offset), which provides a pistonic movement of the membrane and makes it possible to overcome the problems of conventional piezoelectric transducer speakers. This speaker has the advantage of requiring a lesser surface of silicon and of offering a speaker size that is reduced. However, despite these advantages, the technology described in this patent does not allow for large displacements of the membrane, which generates low bandwidth.

Figure 6:
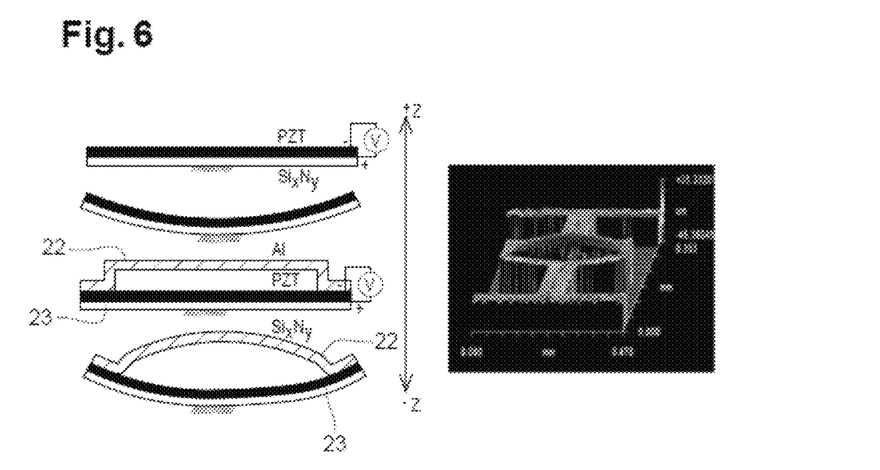
FIG. 6 shows a functional view of a displacement amplifier comprising an aluminium capsule over mounting a piezoelectric actuator.

Moreover, a displacement amplifier has been described that makes it possible to improve the displacement of a bimetallic strip piezoelectric actuator. This displacement amplifier, described under the name of "uniflex" by H Kommepalli in the document "Design, Modeling and Optimization of Piezoelectric Actuators", PhD Thesis, The Pennsylvania State University, 2010, p 138, proposes to couple an aluminium capsule with a conventional bimetallic strip piezoelectric actuator in such a way as to obtain a more substantial displacement. An operating diagram of this displacement amplifier is shown in FIG. 6. This displacement amplifier comprises a flexible capsule made of aluminium 22, fastened laterally on the bimetallic strip piezoelectric actuator 23. Under the effect of the actuation voltage, symbolised by the voltage V, the bimetallic strip piezoelectric actuator 23 bends in the direction −z, mechanically driving a bending of the aluminium capsule 22 in the opposite direction +z. The bending moment of the aluminium capsule 22 thus makes it possible to increase the displacement of the bimetallic strip piezoelectric actuator 23, which offers a greater displacement while still retaining the surface of the actuator.

SUMMARY

To respond to the problems mentioned hereinabove of the performance of miniaturised speakers suitable for being installed in portable devices, the applicant proposes a MEMS speaker wherein a bimetallic strip actuator is coupled to an amplification capsule that integrates an acoustic membrane.

The term "MEMS" is an abbreviation of Microelectromechanical systems, which are miniaturised devices with mobile or vibrating element(s) generally used as actuators or transducers. A MEMS speaker is therefore a miniature speaker suitable for being integrated into a portable device such as a portable telephone or a wireless headset.

According to a first aspect, the invention relates to a MEMS speaker suitable for generating audible sound waves, comprising a bimetallic strip actuation system extending in a first plane, characterised in that it further comprises an amplification capsule comprising:

a membrane extending in a second plane, parallel to the first plane, said membrane comprising a rigid interior zone and a flexible exterior zone, and a rigid coupling wall, fastened at the periphery of the bimetallic strip actuation system to make the exterior zone of the membrane integral with said actuation system.

Such a MEMS speaker has the benefit of increasing the displacement within the speaker while still offering the benefits of piezoelectric transducers in terms of audio performance and ease of being microfabricated.

In addition to the characteristics that have just been mentioned in the preceding paragraph, the MEMS speaker according to an aspect of the invention can have one or more additional characteristics among the following, taken individually or in any technically permissible combination:

the bimetallic strip actuation system comprises at least one piezoelectric actuator integrated into a layer of an elastic material.

the amplification capsule and the bimetallic strip actuation system are of circular shaped with, at rest, an identical outer diameter.

the bimetallic strip actuation system is of annular shape.

the amplification capsule has the shape of a disc and the bimetallic strip actuation system comprises at least one pair of actuators with a rectangular shape, the actuators of each pair being positioned diametrically opposite.

the rigid interior zone of the membrane has a radius comprised between about 10 to 60% of the total radius of the membrane.

the membrane comprises a diameter comprised within an interval ranging from about 100 µm to a few centimetres.

the membrane and the coupling wall of the amplification capsule are made from one single piece in the same material.

the membrane and the coupling wall of the amplification capsule are made from different materials, the coupling wall being glued to the exterior end of the flexible exterior zone of the membrane.

Another aspect of the invention relates to a method of microfabrication of the MEMS speaker such as defined hereinabove, this method comprising the following steps:

a) Choosing a substrate;

b) Deposition, on a front face of the substrate, of at least one oxidation layer and a polysilicon layer;

c) Etching, on the front face, of the coupling wall via photolithography;

d) Deposition of at least one piezoelectric layer to form the actuator e) Etching, at the centre of the piezoelectric layer, of a cavity;

f) Deposition of a protection mask partially covering the cavity and the surface of the piezoelectric layer;

g) Deposition of tracks and/or connection pads in zones not covered by the protection mask;

h) Deposition of a membrane bearing against the coupling wall;

i) Etching, on a rear face of the substrate, of an anchoring pad.

This method can have one or more additional characteristics among the following, taken individually or in any technically possible combination:

the piezoelectric layer is a layer of piezoelectric material associated with two layers of inert metals suitable for forming electrodes.

the cavity, etched in the step e), comprises a drop designed to constitute an electrical access to the piezoelectric layer.

the membrane is deposited on a sacrificial layer covering a zone extending inside the coupling wall, the membrane being provided with emptying orifices suitable for emptying said sacrificial layer.

BRIEF DESCRIPTION OF THE FIGURES

Other benefits and characteristics of the invention shall appear when reading the following description, shown in the figures wherein.

DETAILED DESCRIPTION

An embodiment of a MEMS speaker that can be microfabricated, configured to be able to be inserted into a portable device, is described in detail hereinafter, in reference to the accompanying drawings. This example shows the characteristics and benefits of the invention. It is however reminded that the invention is not limited to this example.

In the figures, identical elements are marked with identical references. For questions of legibility of the figures, the scales of size between the elements represented are not respected.

Figure 7:
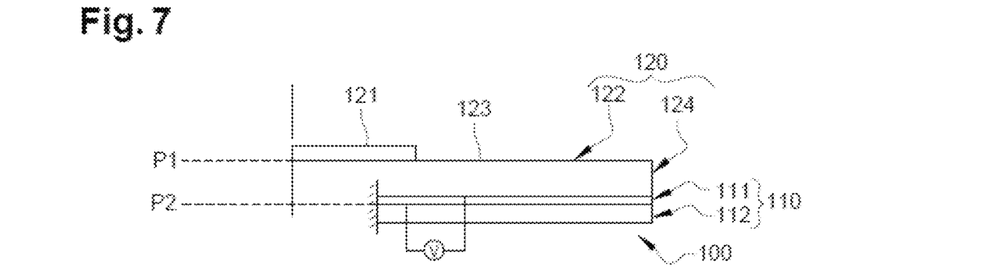
FIG. 7 shows a schematical half cross-section view of a MEMS speaker according to the invention, in the rest position.

An example of a MEMS speaker according to the invention is shown according to a schematical cross-section view in FIG. 7. This MEMS speaker 100, designed to generate sound waves that can be heard by the human ear, comprises a bimetallic strip actuation system 110 and an amplification capsule 120 fastened to one another by their peripheries.

According to certain embodiments, the bimetallic strip actuation system 110 and the amplification capsule 120 are mounted according to an axisymmetric configuration. In these embodiments, the bimetallic strip actuation system 110 and the amplification capsule 120 both comprise a substantially circular shape with, at rest, a substantially identical outer diameter. They are then fastened circumferentially to one another.

In other embodiments, described in detail hereinbelow, the bimetallic strip actuation system 110 and the amplification capsule 120 have different shapes and form a non-axisymmetric configuration. In these embodiments, the amplification capsule 120 can, for example, be circular and the bimetallic strip actuation system 110 rectangular.

The bimetallic strip actuation system 110 comprises an actuator 111 integrated into a layer of an elastic material 112 offering it a bimetal effect. The actuator 111 can be, for example a piezoelectric actuator, made for example from Lead Zirconate Titanate (PZT), Aluminium nitride (AlN), Lithium Niobate (LNO) or any other substrate suitable for piezoelectric technology. The piezoelectric material of which this actuator 111 is mainly made is applied, in the speaker, in a layer called, for reasons of simplicity, layer of piezoelectric material or piezoelectric layer. The actuator 111 is integrated into a layer of an elastic material 112 such as Silicon, Oxide, or any other material suited for the microfabrication of a bimetallic strip; the piezoelectric layer can be applied on the elastic layer 112, for example, by chemical deposition or by layer transfer.

This bimetallic strip actuation system 110 not only has the benefits of the piezoelectric technology described hereinabove, but it also allows for a displacement of the actuator that combines with the displacement of the membrane 122 of the amplification capsule 120, as described in detail hereinbelow.

The amplification capsule 120 comprises a membrane 122 constituting the acoustic membrane of the speaker. At rest, i.e. when the speaker is not operating, the membrane 122 extends in a plane P2, substantially parallel to the plane P1 in which the bimetallic strip actuation system 110 extends, with the planes P1 and P2 extending in the r and y axis of the system of axes (r,y,z).

The membrane 122 comprises an interior zone 121, rigid, and an exterior zone 123, flexible, the interior zone being the central portion of the membrane, in opposition to its offset portion. The membrane 122 therefore has a first coefficient of rigidity k1 in its central zone 121 and a second coefficient of rigidity k2 in its offset zone 123, with k1>k2. For this, the central zone 121 and the offset zone 123 of the membrane 122 can be formed from the same material, for example from silicon (Si), deposited in a thicker layer in the central zone than in the offset zone in such a way as to generate a different rigidity.

The amplification capsule 120 also comprises a coupling wall 124 located at the periphery of the membrane 122. This coupling wall 124 extends perpendicularly to the planes P1 and P2, when it is in rest position, i.e. when the speaker is powered down. The coupling wall 124 can be formed in the same material as the membrane 122, for example manufactured as a single piece with said membrane 122; it can on the contrary be formed from a different material and be added onto the membrane, for example by gluing. The coupling wall 124 includes a first end extending perpendicularly to the plane P2, at the periphery of the membrane 122, and a second end fastened onto the bimetallic strip actuation system 110, at the periphery of said system. The coupling wall 124 is the sole point of contact between the membrane 122 and the bimetallic strip actuation system 110. In the rest position, the coupling wall 124 extends from the exterior end of the membrane 122 to the bimetallic strip actuation system 110, perpendicularly to the plane P2 of the membrane 122.

As shown in FIG. 7, a source of electrical power, referenced as V, is connected to the two electrodes of the actuator 111 to supply an actuation voltage. These electrodes can for example be deposited under and on the substrate layer, or piezoelectric layer, of the actuator 111.

Under the effect of the actuation voltage applied between the two electrodes, the actuator 111 is radially deformed, along an axis r of the system of axes rz. The piezoelectric layer being integral (linked) with the elastic layer 112, a deformation appears along the axis z, induced by the bimetallic strip effect. Indeed, the bimetallic strip effect of the bimetallic strip actuation system 110 transforms the longitudinal displacement of the piezoelectric layer of the actuator 111 into a bending along the axis z. Moreover, in light of the shape of the membrane 122, the rigid portion 121 of the membrane 122 is free only on the axis z. The bending moment generated by the coupling wall 124 that connects the actuator 111 to the flexible portion 123 of the membrane is transformed into a translation of the rigid portion 121 of said membrane along the axis z. An example of the deformation of the bimetallic strip actuation system 110 and of the amplification capsule 120 is schematically shown in FIG. 8.

It is therefore understood that the displacement generated by the amplification capsule 120 is added to the displacement generated by the actuator 111, offering a total displacement that is greater than that of a conventional bimetallic strip actuation system. Although the fact exists that the rigid central portion 121 of the membrane 122 decreases the displacement that an entirely flexible membrane could have, this rigid central portion 121 makes it possible to improve the audio quality of the speaker, by approaching the movement of a rigid piston, with this rigid piston movement corresponding to the ideal movement in terms of sound.

Figure 9:
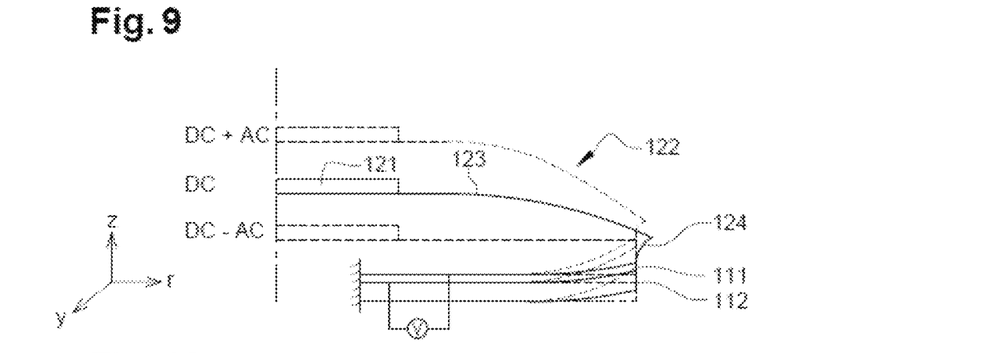
FIG. 9 shows different positions of the MEMS speaker of FIG. 7 according to the voltage applied to the actuator.

FIG. 9 schematically shows examples of internal displacements of the speaker according to the invention depending on the actuation voltage applied to the electrodes of the actuator 111. Indeed, contrary to conventional speakers that can operate with an oscillating alternating voltage around 0V, the speaker 100 according to the invention cannot operate with a negative voltage. Indeed, in order for the amplification capsule 120 to ensure a role as an amplifier regardless of the voltage at the electrodes of the actuator 111, this voltage is positive. Thus, in the implementation of the speaker according to the invention, an offset voltage to be applied to the electrodes of the actuator 111 is predefined. This DC offset voltage can be, for example, chosen equal to half the dynamics of the signal. The displacement is then a variation in the rest point thus obtained, as shown in the example of FIG. 9. In this example, the oscillating electrical signal varies around the predefined offset voltage DC, the DC-AC oscillating voltage corresponding to the rest point and the oscillating DC+AC voltage corresponding to the maximum deformation of the speaker, with DC>AC. The DC offset voltage can for example be 20V and the AC oscillating voltage +/−10V.

Figure 8:
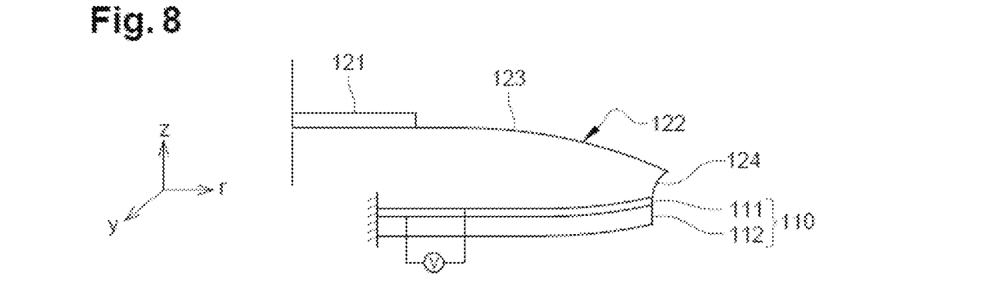
FIG. 8 shows a schematical view as a half cross-section of the MEMS speaker according to the invention, in operation.
Figure 10:
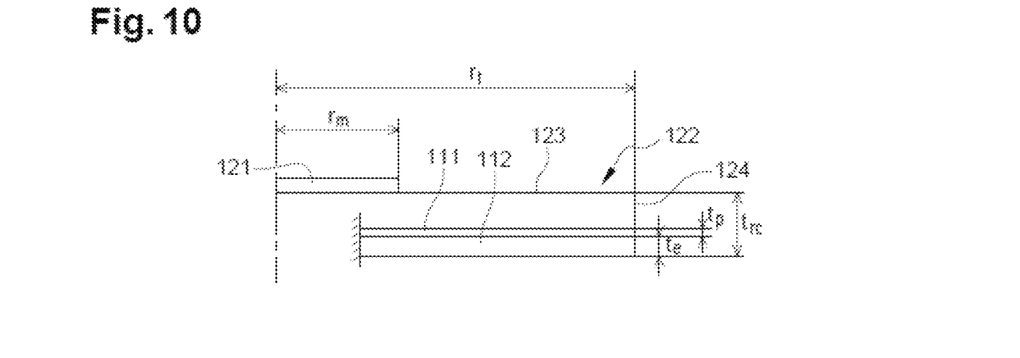
FIG. 10 shows a schematical half cross-section view of an example of dimensions of the MEMS speaker of FIG. 7.

FIG. 10 shows, according to a half cross-section view, examples of dimensions of the MEMS speaker of FIGS. 7 to 9. Indeed, several dimensions of the speaker 100 can vary and be optimised according to the desired performance. These dimensions are as follows:

Total radius $r_t$ of the membrane 122,
Radius $r_m$ of the rigid central portion 121 of the membrane,
Height $t_{rc}$ between the elastic layer 112 of the bimetallic strip actuation system 110 and the membrane 122,
Thickness $t_p$ of the piezoelectric layer 111 of the bimetallic strip actuation system 110, and
Thickness $t_e$ of the elastic layer of the bimetallic strip actuation system 110.

Each one of these dimensions can be modified according to the desired performance for the speaker 100. The membrane 122 comprises for example a diameter comprised within an interval ranging from about 100 µm to a few centimetres. The total radius $r_t$ of the membrane 122 can thus have all the dimensions comprised between about 50 µm and a few centimetres: a total radius of 2 mm can be considered as optimal for the current portable devices.

The radius $r_m$ of the rigid central portion 121 of the membrane in an embodiment has a length of about 10 to 60% of the radius $r_t$ of the membrane. The larger the radius of the rigid central portion is, the better the frequency response of the speaker is. An optimum radius $r_m$ can, for example, be about 1.10 mm for a total radius $r_t$ of 2 mm. The thickness of the rigid central portion of the membrane can be, for example, about 20 µm and the thickness of the flexible offset portion about 5 µm.

The thickness of the elastic layer $t_e$ is chosen sufficiently small to allow for a large displacement of the actuator 111, but sufficiently thick to provide enough force to deform the flexible offset portion 123 of the membrane. The thickness of the elastic layer $t_e$ can, for example, be 5 µm for a thickness $t_p$ of the piezoelectric layer 111 for example of 2 µm, the optimum total thickness of the bimetallic strip actuation system 110 then being about 7 µm.

The height $t_{rc}$ between the elastic layer 112 of the bimetallic strip actuation system 110 and the membrane 122 is chosen sufficiently large to allow for the bending of the flexible offset portion 123 of the membrane but rigid enough to guide the latter correctly. This height toe contributes to the volume occupied by the speaker and determines the height of the coupling wall 124 of the amplification capsule 120. The height $t_{rc}$ can, for example, be 20 µm for the examples of thicknesses $t_e$ and $t_p$ indicated hereinabove.

Figure 11:
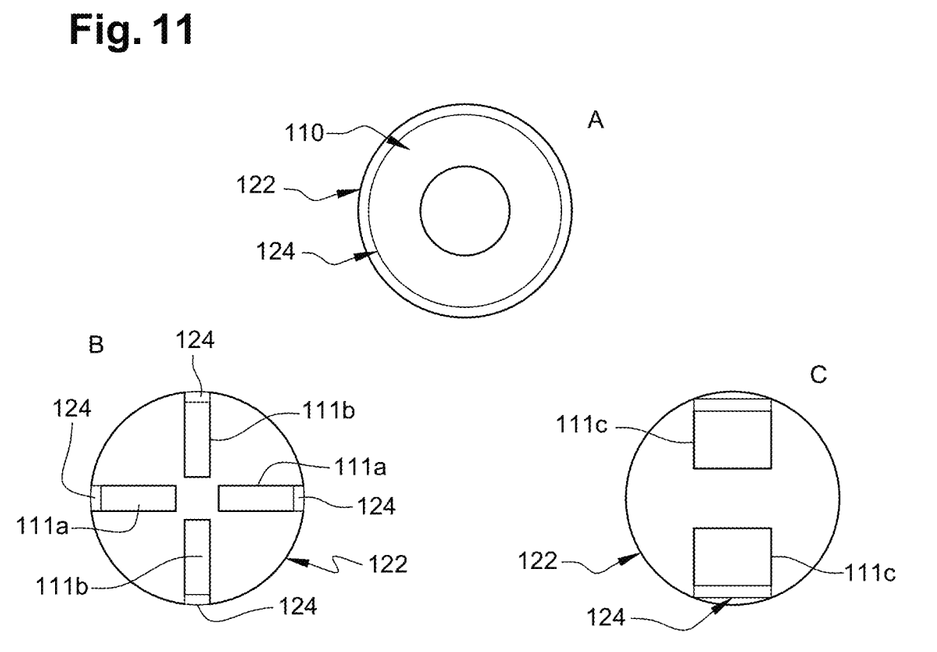
FIG. 11 shows schematical bottom views of several embodiments of MEMS speakers according to the invention.

Examples, according to schematically bottom views, of the MEMS speaker according to the invention are shown in FIG. 11. The portion A of FIG. 11 shows an example of an axisymmetric configuration of the speaker 100. The portions B and C of FIG. 11 show examples of a non-axisymmetric configuration of the speaker 100. In the example of the portion A, the membrane 122 has the shape of disc, the central portion of which is rigid and the offset portion of which is flexible; the bimetallic strip actuation system 110 has the shape of a ring the outer diameter of which, in the rest position, is equal to the outer diameter of the membrane 122. The circumference zone of the membrane 122 and that of the bimetallic strip actuation system 110 are coupled by the coupling wall 124. The thickness of this coupling wall 124 is chosen according to the bending desired for said coupling wall, as explained hereinabove.

Figure 12:
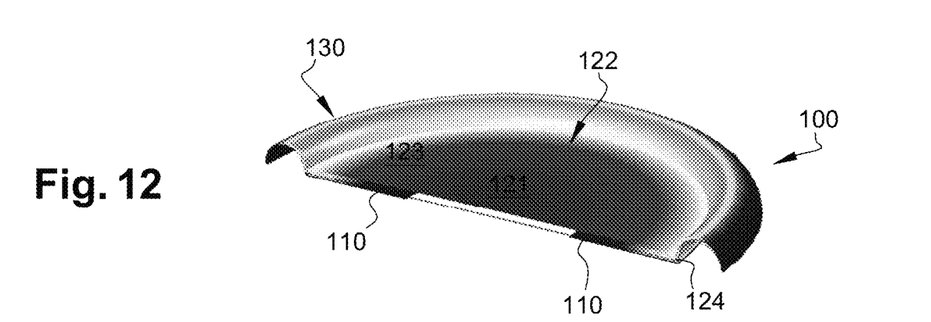
FIG. 12 shows a schematical cross-section view of an example of a MEMS speaker according to the invention.

FIG. 12 shows a cross-section view of a speaker 100 according to the embodiment of the portion A of FIG. 11. It shows in a more precise manner half a speaker with its annular bimetallic strip actuation system 110 and its circular membrane 122, mounted on a suspension device 130, of which the characteristics and properties are known to those skilled in the art and are therefore not described here. FIG. 12 shows, in particular, the rigid central portion 121 and the flexible offset portion 123 of the membrane 122 of which the circumference zone is linked with the coupling wall 124.

Figure 13:
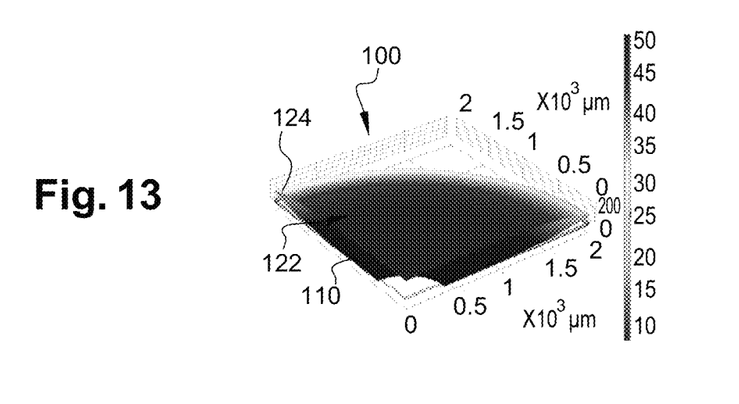
FIG. 13 schematically shows an example of the displacement of the membrane of a MEMS speaker according to FIG. 12.

FIG. 13 shows an example of the total displacement obtained in a MEMS speaker according to the embodiment of FIGS. 11A and 12. According to the colour scale associated with FIG. 13, a displacement of about 35 to 50 µm can be obtained for the membrane 122 of the speaker 100 and a displacement of about 10 to 25 µm can be obtained for the bimetallic strip actuation system 110, these two displacements being added to one another.

In the example of the MEMS speaker according to the embodiment of FIGS. 11A and 12 where the bimetallic strip actuation system has an annular shape, the radius $r_m$ of the rigid central portion 121 of the membrane can be optimised by estimating the acoustic pressure (SPL or PA) according to said radius $r_m$, with a total radius $r_t$ of the membrane 122 fixed and a resonance frequency considered as constant. An example of the change in the acoustic pressure SPL, in dB, is shown on the curve A of FIG. 14, according to the radius of the rigid central portion, in mm, for a resonance frequency and a total radius of the membrane that are constant. The larger the radius of the rigid central portion is, the better the frequency response is up to a radius of about 1.10 mm which seems to be the optimum value for the set of dimensions chosen.

Figure 14:
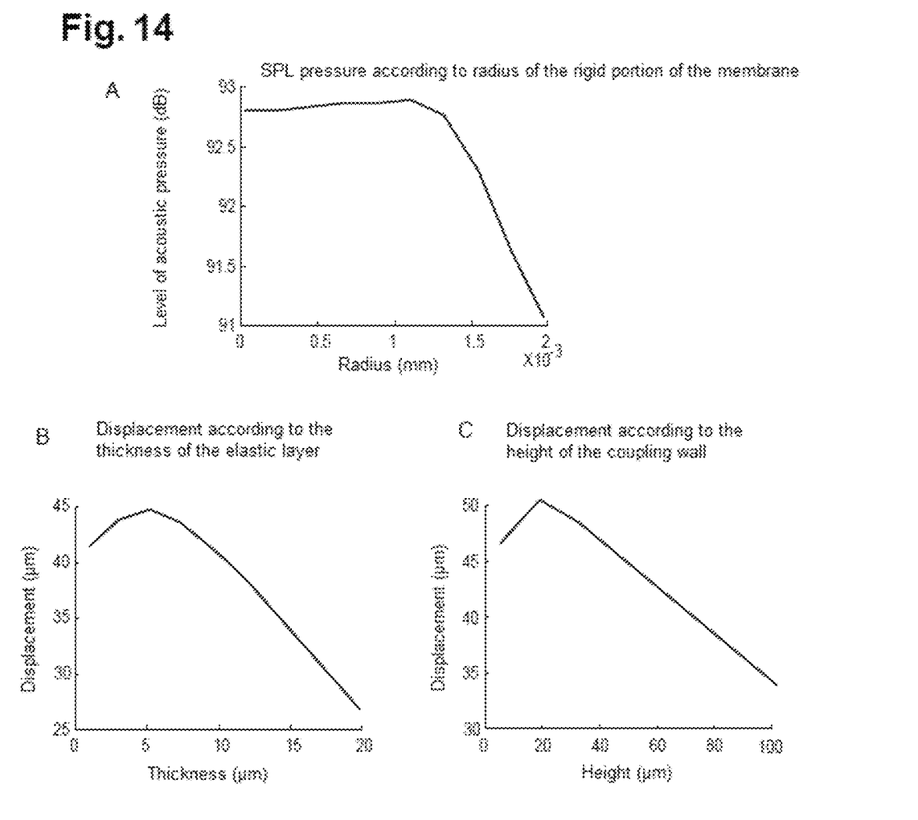
FIG. 14 shows examples of curves that show the acoustic pressure and the displacement of the membrane of a MEMS speaker according to the invention.

The curves B and C of FIG. 14 show changes in the total displacement of the speaker, in μm, according, respectively, to the thickness of the elastic layer 112 of the bimetallic strip actuation system 110 and the height of the coupling wall 124, for a membrane of which the total radius is 2 mm and for a piezoelectric layer 111 of which the thickness is 2 μm. These curves show that, in this example, the optimum thickness of the elastic layer 112 is about 5 μm and the optimal height of the coupling wall 124 is about 20 μm, the optimum values being the values that allow for the largest displacement of the speaker.

The examples described hereinabove correspond to a speaker of which the membrane 122 has a disc shape and the bimetallic strip actuation system 110 is in the shape of a ring. The bimetallic strip actuation system 110 can however have other shapes, such as for example a rectangular shape. Examples of speakers in which the bimetallic strip actuation system is rectangular are shown on the portions B and C of FIG. 11. In these examples, the membrane 122 has the shape of disc and the bimetallic strip actuation system 110 comprises one or more pairs of actuators 111 of which the shape, in the rest position, is substantially rectangular. The actuators 111 can, for example, have the shape of meanderings or beams that are partially embedded. The actuators 111 of each pair of actuators 111a, 111b, 111c are positioned face to face, across from one another, diametrically opposite, at a predetermined distance from one another. Each actuator 111, integrated into a corresponding elastic layer 112 of the same shape and same dimensions as said actuator, has a length less than or equal to the total radius $r_t$ of the membrane 122. In the examples B and C of FIG. 11, the actuators of the pairs of actuators 111a, 111b, 111c are positioned at a distance from one another; however, those skilled in the art will understand that the actuators of a pair of actuators can be juxtaposed one to the other and form, in the rest position, a line of actuators that crosses the membrane from one side to the other.

Regardless of the dimensions of the actuators, the actuators of the same pair are of identical dimensions and are each coupled to the membrane 122 by a coupling wall 124 of which the thickness defines the level of bending of said wall and of which the width is identical to the width of the corresponding actuator. As in the example A where the actuator is of annular shape, the coupling wall 124 of examples B and C of FIG. 11 can be carried out in the same material as the membrane 122 and manufactured in one single piece with said membrane or, on the contrary, be carried out in a different material and added onto the membrane and the actuator, for example by gluing.

In the examples B and C of FIG. 11, the configuration of the speaker is not axisymmetric in such a way that the deformation of the membrane can vary and be unequal or dissymmetric over the entire surface thereof. In other words, the entire surface of the membrane is not displaced in a regular and identical manner, which offers the benefit of greater flexibility of the speaker, i.e. of a relatively low stiffness.

Figure 15:
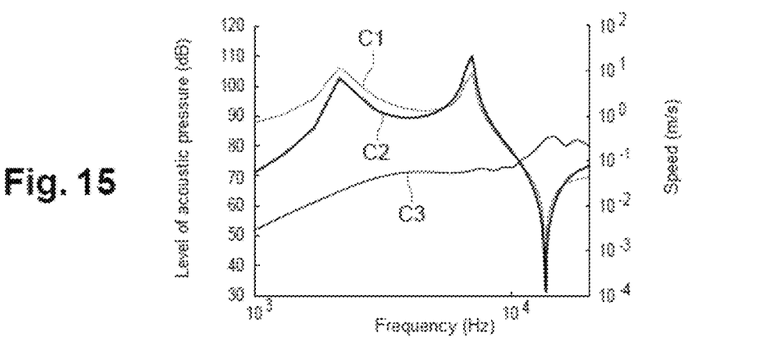
FIG. 15 schematically shows the speed of the membrane and the acoustic pressure of an example of a MEMS speaker according to the invention.

An estimation of the acoustic pressure SPL, generated by the MEMS speaker according to the invention, can be calculated from the speed at the central point of the membrane 122, for example using a modelling software such as the COMSOL Multiphysics® software. An example of such an estimation is shown in FIG. 15 where the curve C1 shows, according to the frequency in Hz, the speed of the speaker according to the invention at the centre of the membrane, C2 represents the acoustic pressure SPL estimated for this speaker C3 represents the acoustic pressure of a speaker according to the prior art and, in particular, the speaker disclosed in patent US 2017/0094418 A1. The curves of FIG. 15 show that, although it is somewhat uneven, the acoustic pressure of the MEMS speaker according to the invention is clearly greater than that of the speaker according to the prior art.

The MEMS speaker such as described hereinabove not only has the benefit of being miniaturised, but it also has the benefit of being able to be obtained by microfabrication. "Microfabrication" means the manufacturing of a microsystem by means of a succession of steps of deposition, photolithography and/or etching of a substrate such as a silicon wafer.

Figure 16:
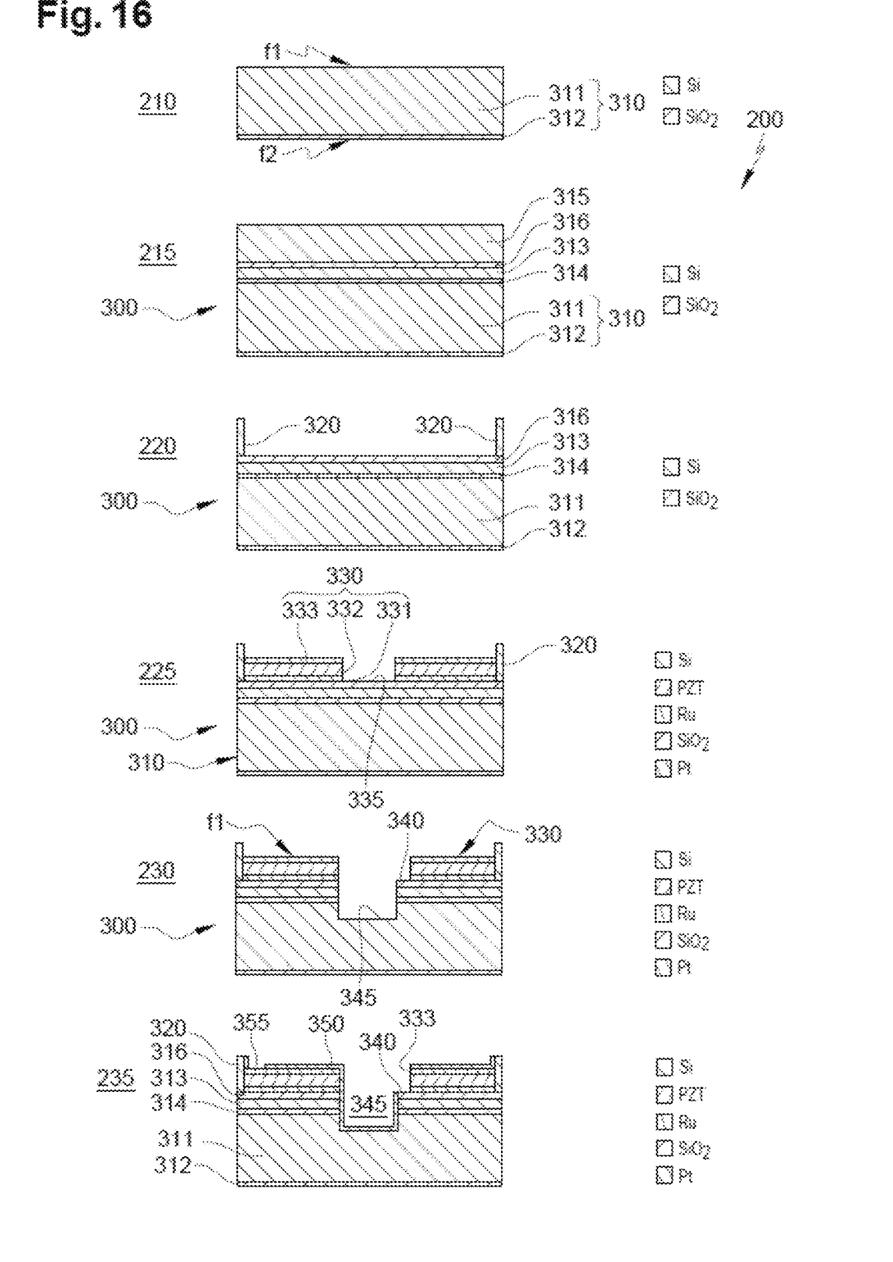
FIG. 16 and FIG. 17 show an example of the method of microfabrication of a MEMS speaker according to the invention.
Figure 17:
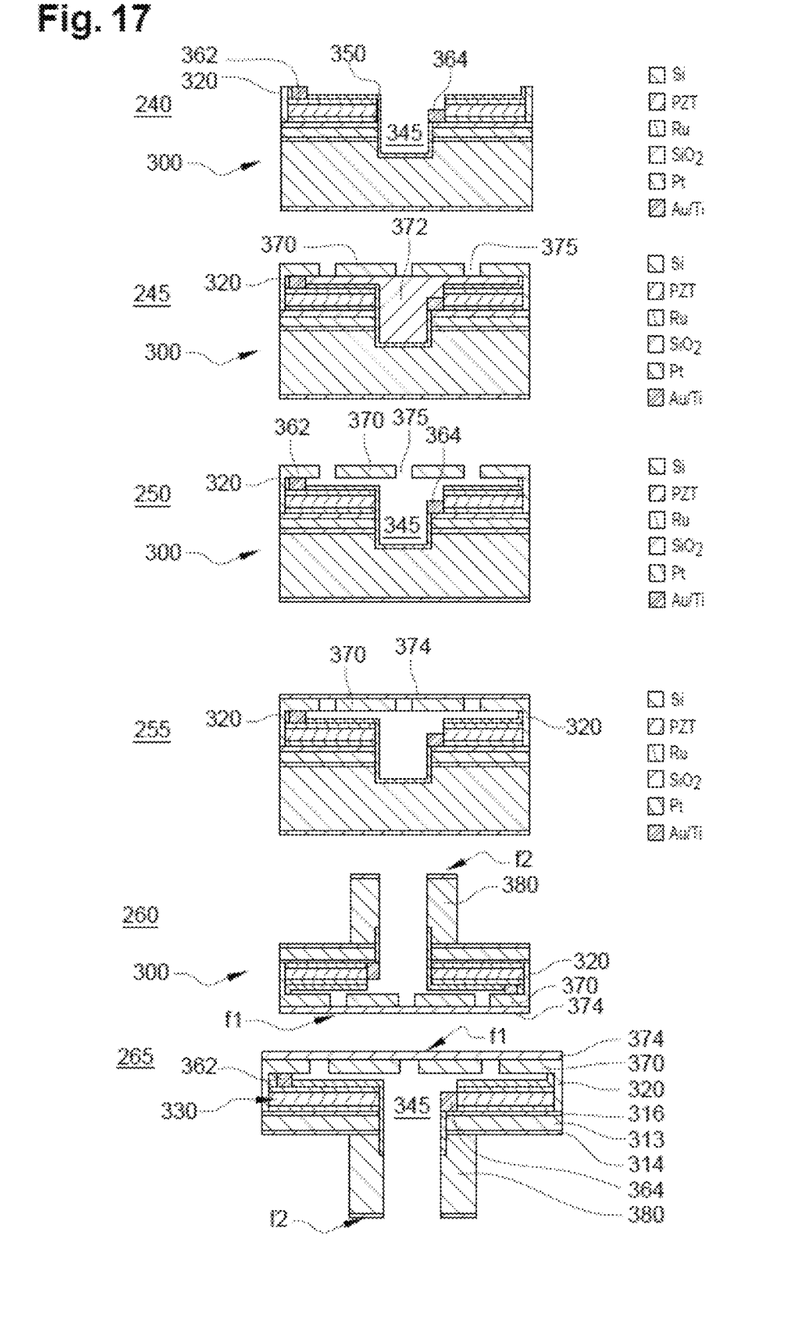

An example of the different steps of the method 200 of microfabrication of a speaker according to the embodiment of FIGS. 11A and 12 is shown in FIGS. 16 and 17, with the steps 240 to 265 shown in FIG. 17 being carried out following the steps 210 to 235 shown in FIG. 16. In these FIGS. 16 and 17, the speaker in the process of manufacture, called component 300, is shown according to cross-section views. Recall that in this embodiment, the membrane and the coupling wall are circular and the bimetallic strip actuation system is annular.

The method 200 of microfabrication comprises a first step 210 of choosing a substrate 310. This substrate 310 can be, for example, a substrate made of silicon 311 provided with an oxidation layer 312 on the rear face f2. The method 200 then comprises a second step 215 of deposition, on the front face f1, of oxidation layers (SiO2) and of polycrystalline silicon, or polysilicon (polySi). This step comprises the deposition of two layers 314, 316 of $SiO_2$, between which are inserted two layers 313, 315 of polySi. The deposition of these layers 313 to 316 can be carried out either by chemical deposition of the layers on one another (a layer of SiO2 then a layer of polySi, etc.), or by gluing thin wafers of $SiO_2$ and polySi on top of one another.

The method then comprises a step 220 of photolithography of the front face f1. This step 220 consists of etching the upper layer 315 of polySi, to the oxidation layer 316, in order to shape the coupling wall 320 therein.

The following step (step 225) consists of depositing, inside the coupling wall 320, the layers intended to form the piezoelectric actuator 330. These layers comprise at least one piezoelectric material and, in an embodiment, layers of inert metals suitable for forming electrodes. These layers can, for example, be a metal layer 331 (for example platinum (Pt)), a layer 332 of piezoelectric material (for example PZT) and a metal layer 333 (for example ruthenium (Ru)), the layers 331 and 333 being designed to form the contact electrodes of the piezoelectric actuator. These layers 331, 332, 333 are deposited in such a way as to not cover the centre 335 of the substrate. For this, the three layers 331, 332, 333 can be deposited chemically and the centre removed by etching of the stack of the three layers; alternatively, the three layers 331, 332, 333 can be glued or transferred onto one another. The stack of these three layers 331, 332, 333 is intended to form the piezoelectric actuator 330 which, integrated into the layers 313, 314, 316 of $SiO_2$ and polySi will form the bimetallic strip actuation system.

The method 200 then comprises a step 230 of photolithography of the front face f1 consisting in a dry etching of the layers 313, 314 and 316 of $SiO_2$ and polySi and a partial etching of the layer 311 of silicon. This step 230 is provided in order to generate a cavity 345 that will give its annular shape to the bimetallic strip actuation system. This cavity 345 comprises a drop 340 between the stack of layers 331, 332, 333 and the oxidation layer 316, this drop 340 having for purpose to allow for access to the layer of piezoelectric material 332.

The following step 235 comprises the deposition of a protection mask 350, for example a nitride, such as a titanium nitride, a tantalum nitride or any other nitride that provides a protection of the piezoelectric material, over the entire surface of the component 300, except for the locations intended to be in contact with electrodes. More precisely, the protection mask 350 is deposited in such a way as to cover the coupling wall 320, the layer 333 of Ru and the entire zone etched, except the drop (height difference) 340 and a predefined zone 355 of the layer 333 of Ru.

The following step 240 consists of depositing the metal tracks and/or connection pads 362, 364, for example made of gold (Au) or made of titanium (Ti), which will allow for the application of the electrical voltage on the piezoelectric actuator.

The following steps 245, 250 and 255 are the steps for manufacturing the membrane 370 of the speaker. The step 245 consists of filling the cavity 345 obtained in steps 225 and 230 with a sacrificial layer 372, for example of $SiO_2$; this filling is provided to cover the entire cavity 345 as well as the entire surface of the component 300 between the coupling wall 320 and the connection pad 362 so as to create a planar and smooth surface on which the membrane 370 can be deposited. The membrane 370, deposited on the sacrificial layer 372, is provided with holes 375 that make it possible, once the membrane is deposited, to suppress the sacrificial layer 372 (step 250), for example using hydrofluoric acid. A non-conformal deposition of an oxide 374 is then carried out above the membrane 370 in order to fill in the holes 375 of said membrane 370.

In an alternative (not shown in the figures), the membrane 270 is carried out separately from the component 300, then added to and glued on said component, overhanging the coupling wall 320. Although more delicate to carry out, this alternative makes it possible to prevent the deposition and the suppression of a sacrificial layer.

Regardless of the alternative chosen, the membrane 370 comprises a thickness that varies from the centre to the exterior of said membrane, with this variation in thickness generating the rigid central portion and the flexible offset portion of the membrane.

After the carrying out of the membrane 370, the method 200 comprises an operation 260 of deep etching of the rear face f2 of the component 300. The component 300 is turned over and its rear face f2 is etched over the entire height of the substrate 310 in such a way as to release the bimetallic strip actuation system. Only one crown 380 of the substrate 310 is retained in order to constitute an anchoring pad allowing for the fastening of the speaker.

The method 200 comprises a final step 265, wherein the finished component 300 is turned over and is ready to be mounted in a portable device.

Although described through a certain number of examples, alternatives and embodiments, the MEMS speaker according to the invention and its method of microfabrication include various alternatives, modifications and improvements which will appear obvious to those skilled in the art, with the understanding that these alternatives, modifications and improvements are part of the scope of the invention.

The invention claimed is:

1. A MEMS speaker adapted to generate audible sound waves, comprising a bimetallic strip actuation system extending in a first plane, and an amplification capsule comprising:
   a membrane extending in a second plane, parallel to the first plane, said membrane comprising a rigid interior zone and a flexible exterior zone, and
   a rigid coupling wall, fastened at a periphery of the bimetallic strip actuation system to make the flexible exterior zone of the membrane integral with said actuation system and, under the effect of an actuation voltage, generate a bending moment resulting in a translation of the rigid interior zone of said membrane.

2. The MEMS speaker according to claim 1, wherein the bimetallic strip actuation system comprises at least one piezoelectric actuator integrated into a layer of an elastic material.

3. The MEMS speaker according to claim 1, wherein the amplification capsule and the bimetallic strip actuation system are of circular shaped with, at rest, an identical outer diameter.

4. The MEMS speaker according to claim 3, wherein the bimetallic strip actuation system is of annular shape.

5. The MEMS speaker according to claim 1, wherein the amplification capsule has a disc shape and the bimetallic strip actuation system comprises at least one pair of rectangular-shaped actuators, the actuators of each pair being positioned facing one another, diametrically opposite.

6. The MEMS speaker according to claim 1, wherein the rigid interior zone of the membrane has a radius comprised between about 10 to 60% of a total radius of the membrane.

7. The MEMS speaker according to claim 1, wherein the membrane comprises a diameter comprised within an interval ranging from about 100 µm to a few centimetres.

8. The MEMS speaker according to claim 1, wherein the membrane and the coupling wall of the amplification capsule are made from one single piece in the same material.

9. The MEMS speaker according to claim 1, wherein the membrane and the coupling wall of the amplification capsule are made from different materials, the coupling wall being glued to an exterior end of the flexible exterior zone of the membrane.

* * * * *